(12) United States Patent
Lifson et al.

(10) Patent No.: US 9,200,811 B2
(45) Date of Patent: Dec. 1, 2015

(54) SYSTEM AND METHOD FOR CONTROL OF HEAT SYSTEM OPERATION BY CHANGING A SWITCHING SET POINT OF OPERATION

(75) Inventors: Alexander Lifson, Manlius, NY (US); Michael F. Taras, Fayetteville, NY (US)

(73) Assignee: CARRIER CORPORATION, Farmington, CT (US)

( * ) Notice: Subject to any disclaimer, the term of this patent is extended or adjusted under 35 U.S.C. 154(b) by 1242 days.

(21) Appl. No.: 12/083,810

(22) PCT Filed: Oct. 18, 2005

(86) PCT No.: PCT/US2005/037337
§ 371 (c)(1),
(2), (4) Date: Apr. 18, 2008

(87) PCT Pub. No.: WO2007/046792
PCT Pub. Date: Apr. 26, 2007

(65) Prior Publication Data
US 2009/0125150 A1    May 14, 2009

(51) Int. Cl.
*F25B 29/00* (2006.01)
*F24F 3/00* (2006.01)
(Continued)

(52) U.S. Cl.
CPC .............. *F24F 3/001* (2013.01); *F24D 12/02* (2013.01); *F24D 19/1039* (2013.01);
(Continued)

(58) Field of Classification Search
CPC .............. F24F 3/001; F24F 2011/0094; F24F 2221/34; F24D 12/02; F24D 19/1039; F24D 2200/04; F24D 2200/12; F25B 13/00; G05D 23/1923; Y02B 30/14
USPC ................ 62/132, 160, 331; 236/10, 51, 1 C; 700/276, 277, 278; 705/7; 165/240, 165/241, 242
See application file for complete search history.

(56) References Cited

U.S. PATENT DOCUMENTS 4,298,056 A * 11/1981 Nelson ........................... 165/238
4,442,972 A *  4/1984 Sahay et al. ................. 236/1 EA
(Continued)

FOREIGN PATENT DOCUMENTS

EP          0691229 A1    1/1996
FR          2699261 A1    6/1994
(Continued)

OTHER PUBLICATIONS

"Coping with Power Failures" by DM Brook; pp. 1-4; year 1999; http://extension.oregonstate.edu/catalog/pdf/em/em8734-e.pdf.*
(Continued)

*Primary Examiner* — Marc Norman
*Assistant Examiner* — Paolo Gonzalez
(74) *Attorney, Agent, or Firm* — Cantor Colburn LLP

(57) ABSTRACT

There is provided a space heating system (100) that includes a heat pump (105), a supplemental gas heating system (110), and a controller (115) connected to the heating system (100). The controller (115) controls a switching set point, which in its simplest case is an ambient temperature at which the controller (115) switches between operation of the heat pump (105) and operation of the supplemental gas heating system (110). The controller (115) is connected to a real time source of information (195) providing at least one of current electricity prices and current prices of a source of heating such as gas, and changes the switching set point in response to changes in at least one of the electricity prices and the gas prices. There is also provided a method for control of the heating system (100).

7 Claims, 1 Drawing Sheet

(51) Int. Cl.
  *F24D 12/02* (2006.01)
  *F24D 19/10* (2006.01)
  *G05D 23/19* (2006.01)
  *F24F 11/00* (2006.01)
  *F25B 13/00* (2006.01)

(52) U.S. Cl.
  CPC ....... *G05D 23/1923* (2013.01); *F24D 2200/04* (2013.01); *F24D 2200/12* (2013.01); *F24F 2011/0094* (2013.01); *F24F 2221/34* (2013.01); *F25B 13/00* (2013.01); *Y02B 30/14* (2013.01)

(56) References Cited

U.S. PATENT DOCUMENTS

| | | | |
|---|---|---|---|
| 4,598,764 A * | 7/1986 | Beckey | 165/242 |
| 4,716,957 A | 1/1988 | Thompson et al. | |
| 4,795,088 A * | 1/1989 | Kobayashi et al. | 236/49.3 |
| 4,909,041 A | 3/1990 | Jones | 62/99 |
| 4,943,003 A * | 7/1990 | Shimizu et al. | 237/2 B |
| 4,948,040 A * | 8/1990 | Kobayashi et al. | 236/49.3 |
| 4,971,136 A * | 11/1990 | Mathur et al. | 165/240 |
| 5,259,445 A * | 11/1993 | Pratt et al. | 165/241 |
| 5,924,486 A * | 7/1999 | Ehlers et al. | 165/238 |
| 6,082,125 A | 7/2000 | Savtchenko | 62/238.6 |
| 6,216,956 B1 * | 4/2001 | Ehlers et al. | 236/47 |
| 6,729,390 B1 * | 5/2004 | Toth et al. | 165/242 |
| 7,567,859 B2 * | 7/2009 | Subramanian et al. | 700/288 |
| 7,621,140 B2 * | 11/2009 | Schnell et al. | 62/157 |
| 2003/0079483 A1 * | 5/2003 | Komatsu et al. | 62/148 |
| 2004/0133314 A1 * | 7/2004 | Ehlers et al. | 700/276 |
| 2005/0150650 A1 * | 7/2005 | Helt | 165/240 |
| 2005/0171645 A1 * | 8/2005 | Oswald et al. | 700/276 |
| 2005/0194456 A1 * | 9/2005 | Tessier et al. | 236/51 |
| 2008/0272934 A1 * | 11/2008 | Wang et al. | 340/870.11 |
| 2009/0171862 A1 * | 7/2009 | Harrod et al. | 705/412 |

FOREIGN PATENT DOCUMENTS

| | | |
|---|---|---|
| JP | 62041547 | 2/1987 |
| WO | WO9922284 | 5/1999 |

OTHER PUBLICATIONS

International Search Report issued Mar. 9, 2006 for the corresponding international application PCT/US2005/037337.
European Search Report, Supplementary European Search Report, and European Search Opinion for International Application No. PCT/US2005/037337, Apr. 6, 2011, 8 pages.

* cited by examiner

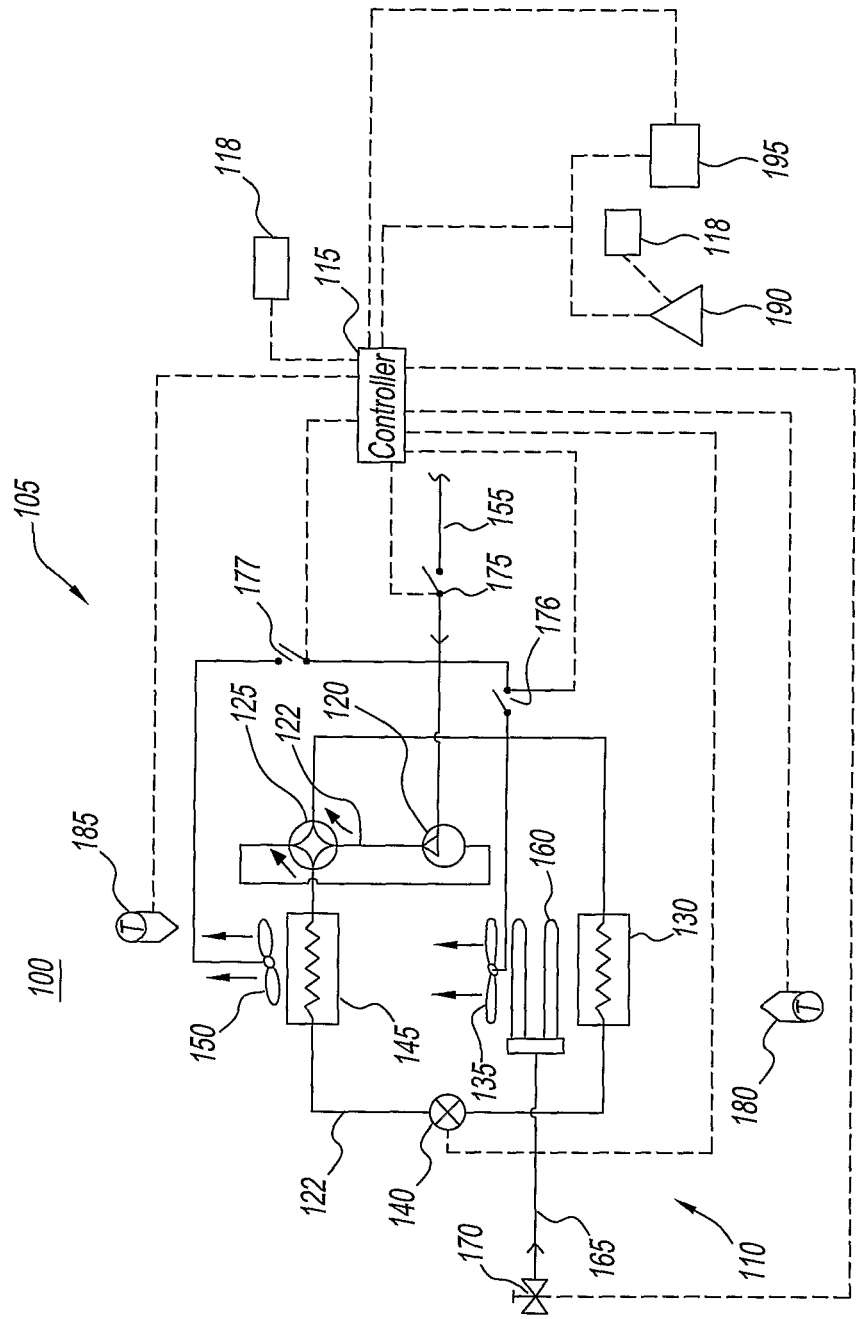

SYSTEM AND METHOD FOR CONTROL OF HEAT SYSTEM OPERATION BY CHANGING A SWITCHING SET POINT OF OPERATION

BACKGROUND OF THE INVENTION

1. Field of the Invention

The present invention relates to refrigerant systems, and more particularly to heat pump refrigerant systems equipped with supplemental heating.

2. Description of the Related Art

Some heat pump systems are equipped with supplemental gas heating means. During operation of these systems, when the ambient temperature falls below a certain level (at specified indoor conditions), it becomes more efficient to switch from utilizing electric energy and running a heat pump in a heating mode to heating an indoor environment by engaging supplemental gas (natural gas, propane, butane, etc.) heat, supplemental heat from other commodities such as oil, heated water, and/or heated air. Currently this is accomplished by setting a thermostat within a conditioned (heated in this case) environment that switches between the heat pump mode of operation, and gas heating at a predetermined ambient temperature, normally at about 20° F., for a conventional indoor temperature range about 70° F.+/−5° F. Sometimes an installer or a consumer can also adjust the standard factory setting by removing a panel to get access to this internal thermostat. When the ambient temperature falls below this predetermined setting, the gas or other supplemental heat is engaged.

A major drawback of having the predetermined setting of switching between the heat pump mode of operation and the supplemental heating is that this setting cannot be changed in real time, as it corresponds to a certain predetermined value that is established either at the factory or by the user, i.e., installer. The value of this predetermined setting is based on rule-of-thumb knowledge regarding heat pump system operation, thermal behavior of the heated structure, as well as electricity and gas (or other commodity) prices.

Even worse, for a vast majority of prior art cases, and especially for single-circuit heat pump systems, a thermostat setting was typically based on a balance point of a structure that would depend on indoor and outdoor conditions (primarily temperatures for heating systems). A balance point is an outdoor temperature at which a heat pump does not provide enough heat for a specific thermostat setting corresponding to a specific indoor temperature. The balance point had little to do with heating system optimization. On contrary, it was simply assumed that it was more cost efficient to run a single-circuit heat pump at all ambient conditions. In reality, the lower the gas price, the higher the ambient temperature at which it would be most efficient to switch to gas heat from running the electrically-powered heat pump. Therefore, the ambient temperature at which it becomes efficient to switch between gas and electricity is directly dependent on the ratio of gas-to-electric prices.

However, being a commodity, both electricity prices and gas prices fluctuate rapidly. It has been known, for example, that it is possible for electricity prices to vary by a factor of 10 or more during a 24-hour period, as electricity prices can be very low during off-peak hours at night and rise dramatically during a day. Gas prices can also fluctuate rapidly on a daily basis, though generally not as quickly as electricity prices.

Also, during the periods of high demand for electricity, the electric grid may operate close to a limit it can handle. Thus, along with rising cost for electricity during this time, there is a danger for the power supply interruptions and disruptions in the electric network operation that could lead to catastrophic consequences. Switching to gas or other supplemental heat in such circumstances will increase a safety margin of the electric grid operation.

Therefore, there is a need for a system and method that allows for adjustment of the switching set point between supplemental gas heating and electric operation of the heat pump system in real time, in response to changes in gas and electricity prices, to maximize savings to the consumer and to possibly prevent electric grid overloading.

SUMMARY OF THE INVENTION

There is provided a space heating system that includes a heat pump, a supplemental heating system, and a controller connected to the heating system for controlling a switching set point between modes of operation. The switching set point is at least an ambient temperature at which the controller switches between operation of the heat pump and operation of a source of the supplemental heating. The controller is connected to a source of information providing at least one of current electricity prices and current prices of the source of the supplemental heating. The controller changes the switching set point in response to changes in at least one of the electricity prices and the prices of the source of the supplemental heating.

There is also provided a method for control of a heating system having a heat pump and supplemental heating, via a computer system. The method includes at least periodically receiving data related to current prices of at least one of electricity and a source of the supplemental heating, and automatically changing a switching set point in response to price changes in at least one of the electricity prices and prices of the source of the supplemental heating.

In one embodiment, the supplemental heating is provided from a source of heat including oil, gas, heated water, and/or heated air.

In a further embodiment, the controller utilizes information on the heating system operational efficiency at various indoor and outdoor thermodynamic conditions (primarily temperatures) along with real time electricity and gas prices to determine an optimal switching set point.

In another embodiment, the controller analyzes the trends in such thermodynamic conditions as well as in electricity and gas prices to react proactively in adapting the control logic to select an optimal switching set point for an extended time interval and to limit a number of switches for cyclic loss reduction and reliability improvement.

In yet another embodiment, a decision of optimal operation for a multi-circuit system is obtained by a combination of the heat pump operation for some circuits and gas heat operation based on similar criteria for optimal operational efficiency.

In still another embodiment, a signal of a mandatory switch to gas heating may be issued over the network, if the electric grid is operating close to an overload point, to prevent power supply interruptions.

BRIEF DESCRIPTION OF THE DRAWINGS

FIG. 1 shows a refrigerant system equipped with a gas heat function including a diagnostic system according to the present invention.

DESCRIPTION OF THE INVENTION

FIG. 1 shows a space heating system 100 including a heat pump 105 and supplemental gas heating system 110, and a controller 115 for controlling the components of heat pump 105 and gas heating system 110, and for switching between operation of heat pump 105 and gas heating system 110. The schematic presented in FIG. 1 is purely exemplary; there are many possible configurations and variations of the design of space heating system 100 that are not shown but fall within the scope of the invention.

The supplemental heating system 110, although discussed primarily as a gas heating system, is not limited to gas heating. Other suitable sources of heat may be used, including other commodities such as oil, heated water, and/or heated air.

Heat pump 105 includes a compressor 120 for delivering compressed refrigerant into refrigerant line 122 and through a four-way reversing valve 125, which directs refrigerant so that heat pump 105 operates in a heating mode or in a cooling mode. In the heating mode, compressed refrigerant passes through indoor heat exchanger 130, where the refrigerant condenses and releases heat into an interior space, such as a room in a building or home. An indoor fan 135 blows air over indoor heat exchanger 130 to supply heat into the interior space to be heated. The refrigerant then progresses through an expansion device 140 and through an outdoor heat exchanger 145, where the refrigerant, which is expanded to lower pressure and temperature, evaporates and cools outdoor air, absorbing heat from this outdoor air. Relatively cold air is blown over outdoor heat exchanger 145 by outdoor fan 150. The evaporated refrigerant then returns to compressor 120, through four-way reversing valve 125 once again, to repeat the cycle. A source of electricity powers compressor 120, indoor fan 135 and an outdoor fan 150 via electricity supply line 155.

Heating system 100 also includes supplemental gas heating system 110, which includes a gas (e.g. natural gas, propane, butane, etc.) source and a gas heat exchanger 160. Natural gas is delivered to heat exchanger 160 via gas line 165, and is controlled by gas supply valve 170. When the call for gas heating is issued by controller 115, gas supply valve 170 is opened and a mixture of gas and air of a proper composition is ignited and flown into the tubes of gas heat exchanger 160. When this mixture passes over internal surfaces of heat exchanger 160, it releases heat that is accepted by air blown over external surfaces of heat exchanger 160 by indoor fan 135 and is supplied to the interior environment. The flue gas exits heat exchanger 160 through a flue shoot (not shown) and may be assisted to overcome flow impedances by a flue fan (not shown). Heat exchanger 160 may have heat transfer and flow enhancement elements positioned on internal and external surfaces. These enhancement techniques are known in the art.

Controller 115 is connected to several components of heat pump 105, including compressor 120, four-way reversing valve 125, indoor fan 135 and outdoor fan 150, expansion device 140, and switches 175, 176, and 177 for respectively controlling the operation of compressor 120, indoor fan 135 and outdoor fan 150 via electricity supply line 155. Controller 115 is also connected to gas supply valve 170 for controlling the operation of supplemental gas heating system 110.

Heating system 100 can also include an outdoor temperature sensor 185 and an indoor temperature sensor 180 which are connected to controller 115, for providing outdoor environment temperature data and temperature data associated with air supplied to indoor space, respectively, to controller 115. In other instances the outdoor temperature, i.e., ambient temperature can also be determined by using information received via the Internet.

In one embodiment, controller 115 includes a thermostat (not shown). The thermostat function involves switching between operation of heat pump 105 and gas heating system 110 based on switching conditions provided by controller 115. In some cases, a thermostat could substitute an indoor temperature sensor as well.

The switching set point is a set of operating conditions at which controller 115 switches between operation of heat pump 105 and operation of supplemental gas heating system 110 for providing heat to an interior space. In many cases, e.g. for a conventional indoor temperature range of 70° F.+/−5° F., the ambient temperature would adequately represent this set of operating conditions. For example, if the switching ambient temperature is 30° F., controller 115 for space heating system 100 will operate heat pump 105 when the ambient temperature, as read by controller 115 via temperature sensor 185, is above 30° F. When the ambient temperature falls below 30° F., space heating system 100, via controller 115, shuts off or reduces (e.g. unloads heat pump by shutting down some of its circuits or utilizing any compressor unloading means such as speed change, bypass, etc.) the function of heat pump 105 and activates gas heating system 110. The switching set point may be pre-set, set by a user, or as described below, dependent on factors including changes in current electricity and/or gas prices.

Controller 115 preferably includes a computing platform, such as a personal computer, a mainframe computer, or any other type of computing platform that may be provisioned with a memory device (not shown), a CPU or microprocessor device (not shown), and several I/O ports (not shown). Controller 115 may also include a display or other device for providing information, such as temperature information.

Heating system 100 may also include an interface 118 connected to remote controller 190 for providing information related to the ambient temperature, performance,maps for heat pump system 105 and gas heating system 110 (similar information is preferably stored in the controller 115 as well), the switching set point and both current and previous gas and electricity prices, and receiving instructions regarding changing the switching set point in relation to gas and/or electricity prices. Interface 118 may also allow a user to set component parameters and to directly control components of heating system 100. In one embodiment, a remote controller 190, located some distance from heating system 100, is provided and includes an interface through which a user can send instructions and receive information from controller 115.

Controller 115 controls the switching set point, i.e., switching set of operating conditions, which in one embodiment and in the simplest case, is an ambient temperature at which controller 115 switches between operation of heat pump 105 and operation of supplemental gas heating system 110. Controller 115 is also connected to a source of information 195 that provides at least one of current electricity prices and current gas prices. Controller 115 changes the switching set point in response to changes in current electricity prices and/or gas prices.

Source of information 195 can be any available source of gas and electricity commodity prices, such as a web site including or having access to a database that is updated in real time with current values of gas prices and electricity prices. Source 195 should be able to provide real time, current information on gas and electricity prices, and preferably be able to continuously provide this information to controller 115.

Controller 115 is connected to the information source via a network such as a local area network, an Intranet, and the Internet. A preferred source is an Internet web site. Controller 115 can be connected to source of information 195 through a customer's private or secured Internet connection. Controller 115 can also be directly connected to source of information 195, so that switching from electric to gas operation could also be made remotely, with or without a consumer having a direct access to Internet. In this case, controller 115 would be equipped with an internal chip or other device that can receive commodity price information on the cost of electricity and/or gas without engaging the consumer's Internet connection.

Controller 115 at least periodically receives current gas prices and electricity prices, each at least from one source of information. In another embodiment, controller 115 continuously receives the gas and electricity prices.

In one embodiment, controller 115 calculates a ratio between received gas prices and received electricity prices, and changes the switching set point in response to changes in this ratio and in accordance with the performance maps of both heating systems 105 and 110. Controller 115 typically increases the switching set point ambient temperature, i.e., switching temperature, as electricity prices increase relative to gas prices, and decreases the switching temperature as electricity prices decrease relative to gas prices. As the switching set point ambient temperature is decreased in response to decreasing electricity prices, the heat pump is utilized over an extended range of environmental conditions in order to take advantage of the decreasing electricity prices.

In another embodiment, controller 115 changes the switching set point based on a predetermined mathematical relationship between the switching set point and the electricity prices and/or gas prices. Controller 115 may increase the switching set point ambient temperature as electricity prices increase, and decrease the switching set point ambient temperature as electricity prices decrease. The changes in switching temperature may have a linear relationship with changes in electricity and/or gas prices, or have any other defined relationship. Changes in the switching temperature may be based on gas or electricity prices alone, both gas and electricity prices, and/or a ratio of gas and electricity prices.

Also, additional factors can be taken into account when controller 115 changes the switching set point. These correction factors can include, but are not limited to the temperature of the environment to be heated, as well as the size and efficiency of heating systems 105 and 110 and their components such as evaporator and condenser heat exchangers 130 and 145 and gas heat exchanger 160. Such correction factors can be preprogrammed at the factory during manufacture of system 100 or uploaded into the controller 115. In another embodiment, controller 115 also includes delay functions to prevent rapid cycling between gas and electric as the switching set point changes, to further optimize operation of heating system 100, reduce cyclic loss and improve system reliability. In such circumstances, controller 115 adapts operation of heating system 100 in accordance with "historical" trends in indoor/outdoor environmental conditions as well as in electricity and gas prices.

In another embodiment, controller 115 may change the switching set point based on factors including a prediction of what the ambient temperature will be at a predetermined future time, and/or historical trends of electricity and gas prices.

In yet another embodiment, heating system 100 has unloading means for a single circuit (such as variable speed compressor and/or fans, compressor bypass, etc.) or incorporates multiple independent circuits, and an optimal operation for this system at some environmental conditions could be obtained by a combined heat pump and gas heat operation, based on similar criteria for optimal operational efficiency.

In still another embodiment, a warning signal indicating a potential overload in an electric grid, or a signal of a mandatory switch to gas heating may be issued over the network, if the electric grid is operating close to an overload point, to prevent power supply interruptions.

A method is provided for control of heating system 100 having heat pump 105 and supplemental gas heating 110, via a computer system. The method includes at least periodically receiving data related to current prices of at least electricity and/or heating gas, and automatically changing the switching set point in response to changes in at least one of electricity prices and heating gas prices. In one embodiment, the method includes continuously receiving the data.

In one embodiment of the method, the changes in electricity prices and/or gas prices are changes in a ratio between electricity prices and gas prices. The switching set point ambient temperature increases as the electricity prices increase relative to gas prices, and decreases as said electricity prices decrease relative to gas prices.

The method may also include setting a predetermined mathematical relationship between the switching set point and the electricity prices and/or gas prices. The switching set point ambient temperature increases as electricity prices increase, and decreases as electricity prices decrease, according to the predetermined mathematical relationship.

The embodiments described above include a supplemental heating system utilizing heating gas (e.g. natural gas, propane, butane, etc.). The present invention is not limited to heating systems having supplemental gas heating, and may include supplemental heating systems utilizing heating sources or commodities such as oil, gas heated water or air, or other systems utilizing non-electric resources.

The present invention adjusts and optimizes a switching set point of a heat pump system equipped with a supplemental heat function, based on the prices of a source of heat and of electricity at a particular instance in time, or based on the analysis of the trends of these prices, preferably by obtaining such information over an information network such as the Internet. In one embodiment, the supplemental heating function is a gas heating function. The optimal switching set point between the heat pump mode and gas heating mode is primarily dependant on indoor and outdoor thermodynamic conditions, gas-to-electric price ratios and the heating system thermal efficiency in both modes of operation. In general, this system and method reduce the operational cost by utilizing supplemental gas heating when gas prices fall relative to electricity prices, or restricting use of supplemental gas heating when gas prices rise relative to electricity prices. In accordance to the above-mentioned factors, a system controller determines which mode of operation is the most efficient. Additionally, if the controller's adaptive logic takes into account "historical" trends of electricity and gas prices and indoor/outdoor temperatures profiles then this information may further assist in enhancement of operational efficiency, limiting a number of switching cycles, reducing cyclic losses and improving system reliability.

The system and method becomes increasingly relevant and practical as more and more homes and commercial buildings are equipped with Internet capability that is integrally connected to various electronic components located within the building structure, such as wall thermostats, where adjustments in temperature settings can be made remotely over the Internet. The system and method of the present invention, by real time switching between electric and heating gas supplies based on fluctuations of electricity and gas prices, maximizes savings to the consumer.

It should be understood that various alternatives, combinations and modifications of the teachings described herein could be devised by those skilled in the art. The present invention is intended to embrace all such alternatives, modifications and variances that fall within the scope of the appended claims.

What is claimed is:

1. A method for control of a heating system having a heat pump and supplemental heating, via a computer system, comprising:
   at least periodically receiving data relating to current prices of at least one of electricity prices and prices of a source of said supplemental heating, the source of said supplemental heating being oil or gas; and
   automatically changing a switching set point in response to price changes in at least one of said electricity prices and prices of said source of said supplemental heating, wherein said switching set point is a temperature at which said heating system switches between operation of said heat pump and operation of said supplemental heating;
   wherein said switching set point temperature is increased as said electricity prices increase relative to said prices of said source of said supplemental heating, and wherein said switching set point temperature is decreased as said electricity prices decrease relative to said prices of said source of said supplemental heating; and switching between operation of said heat pump and operation of said supplemental heating based on said switching set point.

2. The method of claim 1, wherein said price changes in at least one of said electricity prices and said prices of said source of said supplemental heating are changes in a ratio between said prices of said source of said supplemental heating and said electricity prices.

3. The method of claim 1, wherein changing said switching set point is accomplished by a method selected from the group consisting of:
   changing said switching set point based on a predetermined mathematical relationship between at least said switching set point temperature and at least one of said electricity prices and said prices of said source of said supplemental heating;
   changing said switching set point in accordance with performance maps of at least one of said heat pump operation and said supplemental heating operation;
   changing said switching set point in response to at least one trend of a characteristic selected from the group consisting of: electricity prices, prices of said source of said supplemental heating, ambient temperatures, indoor temperatures, and any combination thereof; and
   changing said switching set point based on factors selected from the group consisting of: a prediction of what said ambient temperature will be at a predetermined future time, historical trends of electricity and gas prices, and a combination thereof.

4. The method of claim 1, wherein said method includes continuously receiving said data.

5. The method of claim 1, wherein said heating system is selected from the group consisting of
   a single-circuit system, wherein said system includes unloading means, wherein switching between operation of said heat pump and operation of said supplemental heating includes unloading said heat pump, and
   a multi-circuit system having multiple independent circuits, wherein said switching includes shutting down at least one circuit of said heat pump.

6. The method of claim 1, further comprising automatically switching from operation of said heat pump to operation of said supplemental heating in response to a signal indicating a potential overload in an electric grid.

7. The method of claim 1, further comprising receiving ambient temperature information via the Internet.

* * * * *